United States Patent [19]

Maki et al.

[11] 4,418,586

[45] Dec. 6, 1983

[54] SWASH PLATE DRIVE MECHANISM

[75] Inventors: E. Roland Maki, Rochester, Mich.; Ferdinand Freudenstein, Riverdale, N.Y.

[73] Assignee: General Motors Corporation, Detroit, Mich.

[21] Appl. No.: 265,653

[22] Filed: May 20, 1981

[51] Int. Cl.³ .................. F16H 23/00; F16H 35/08
[52] U.S. Cl. .................................. 74/831; 74/60; 74/837; 92/12.1
[58] Field of Search .................. 74/831, 832, 837, 60; 91/504–506, 502; 92/12.1; 417/222

[56]  References Cited
U.S. PATENT DOCUMENTS

| 748,559 | 12/1903 | Peet | 74/60 X |
|---|---|---|---|
| 1,659,374 | 2/1928 | Robson | 91/505 X |
| 2,465,510 | 3/1949 | Bonnafe | 417/222 |
| 2,513,083 | 6/1950 | Eckert | 74/60 |
| 2,532,254 | 11/1950 | Bouchard | 74/60 |
| 3,076,345 | 2/1963 | Leclercq | 74/60 |

| 4,235,116 | 11/1980 | Meijer et al. | 417/222 X |
|---|---|---|---|

FOREIGN PATENT DOCUMENTS

| 89352 | 9/1922 | Fed. Rep. of Germany | 91/502 |
|---|---|---|---|
| 1037799 | 8/1958 | Fed. Rep. of Germany | 74/60 |
| 2751846 | 6/1978 | Fed. Rep. of Germany | 74/60 |

Primary Examiner—Ernest R. Purser
Attorney, Agent, or Firm—R. L. Phillips

[57]  ABSTRACT

A swash plate drive mechanism for an axial piston machine is disclosed comprising a pair of yokes with intersecting longitudinal axes and intersecting cross-axes and a swash plate drivingly connected with the pistons and pivotally connected between the yokes for pivotal movement about their cross-axes whereby the swash plate is caused to oscillate and effect double frequency drive between the piston and yokes and wherein the limits of swash plate oscillation are dependent on the angle between the longitudinal axes of the yokes and are fixed or variable and which in the latter event reach zero on alignment of the longitudinal axes.

4 Claims, 3 Drawing Figures

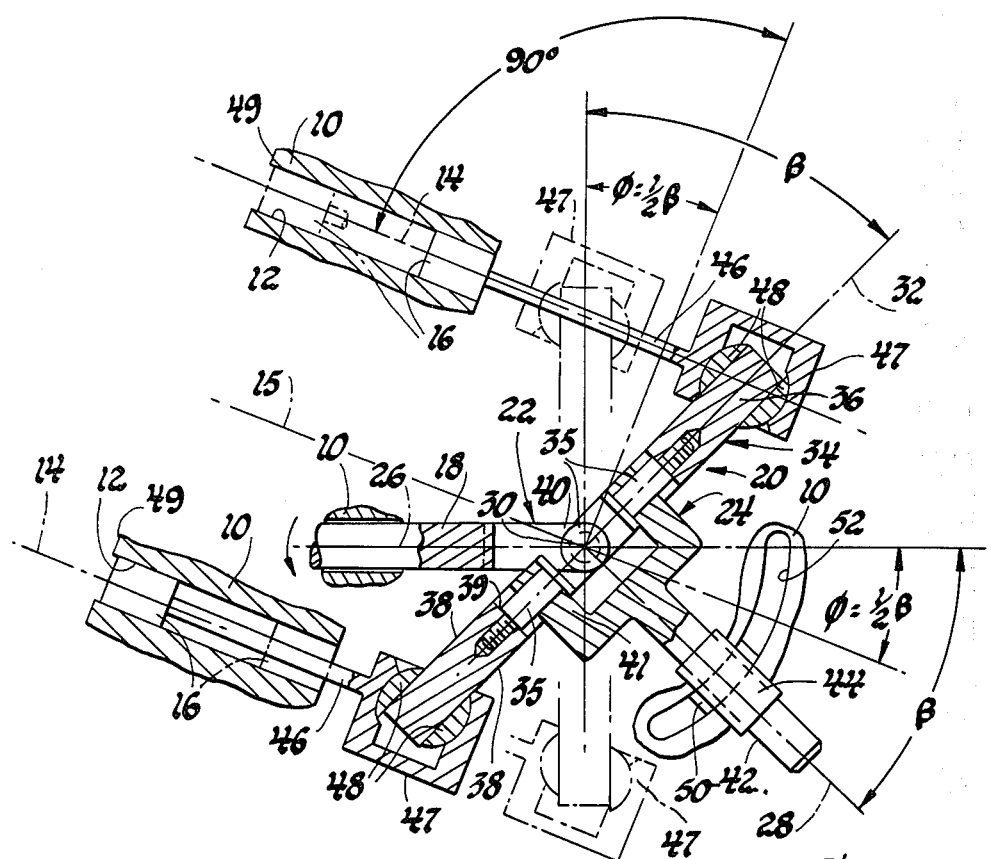
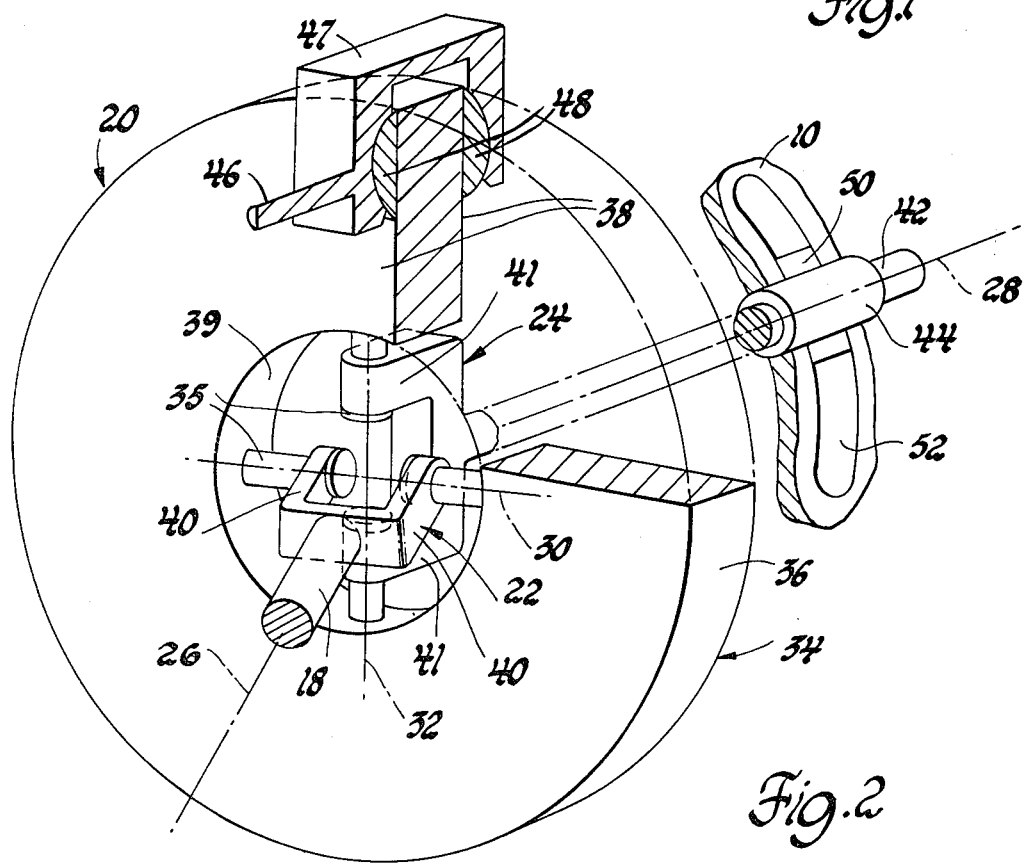

SWASH PLATE DRIVE MECHANISM

This invention relates to swash plate drive mechanisms and more particularly to a swash plate drive mechanism having an articulated swash plate providing double-frequency drive.

Conventional swash plate drive mechanisms having a rotary inclined disk provided single-frequency drive; i.e. one oscillation or reciprocating motion producing cycle for each revolution thereof. For example, in the conventional swash plate drive mechanisms used in axial-piston machines (compressors or engines), the swash plate is slidably, drivingly, connected with one or more pistons and there occurs reciprocation thereof once each swash plate revolution and regardless of whether the cylinder block rotates or is stationary.

The swash plate drive mechanism of the present invention is a substantial improvement thereover in providing double frequency drive with either fixed or variable stroke and in a very simple and compact arrangement. This is accomplished utilizing a Hooke-type universal joint arrangement. The new swash plate drive mechanism basically comprises a pair of yokes with intersecting longitudinal axes and intersecting cross-axes and a swash plate that is pivotally connected to the yokes like the normal floating cross-link of a Hooke-type joint. However, the cross-axes need not be at right angles as required in such conventional universal joint. The thus articulated swash plate is caused to pivot about the yoke's cross-axes and thereby imparts a double frequency motion to the piston during each revolution of the yokes. On powering the rotary input yoke in the case of a compressor or pistons in the case of an engine the articulated swash plate through its enforced double-frequency oscillations requires the pistons to reciprocate twice for each revolution of the input (compressor input) or output (engine output) thus effectively doubling the piston displacement as compared with an axial piston machine having a conventional non-articulated swash plate drive. Moreover, the new swash plate drive mechanism may provide a fixed or variable stroke by simply fixing or varying the angle between the yoke's longitudinal axes with the stroke reaching zero on alignment of these axes.

These and other objects, advantages and features of the present invention will be more apparent from the following description and drawing in which:

FIG. 1 is a schematic view of an axial-piston machine with a stationary cylinder block and single-acting pistons and having incorporated therein one embodiment of the swash plate drive mechanism according to the present invention.

FIG. 2 is an enlarged perspective view of the swash plate drive mechanism in FIG. 1.

Figure 3:
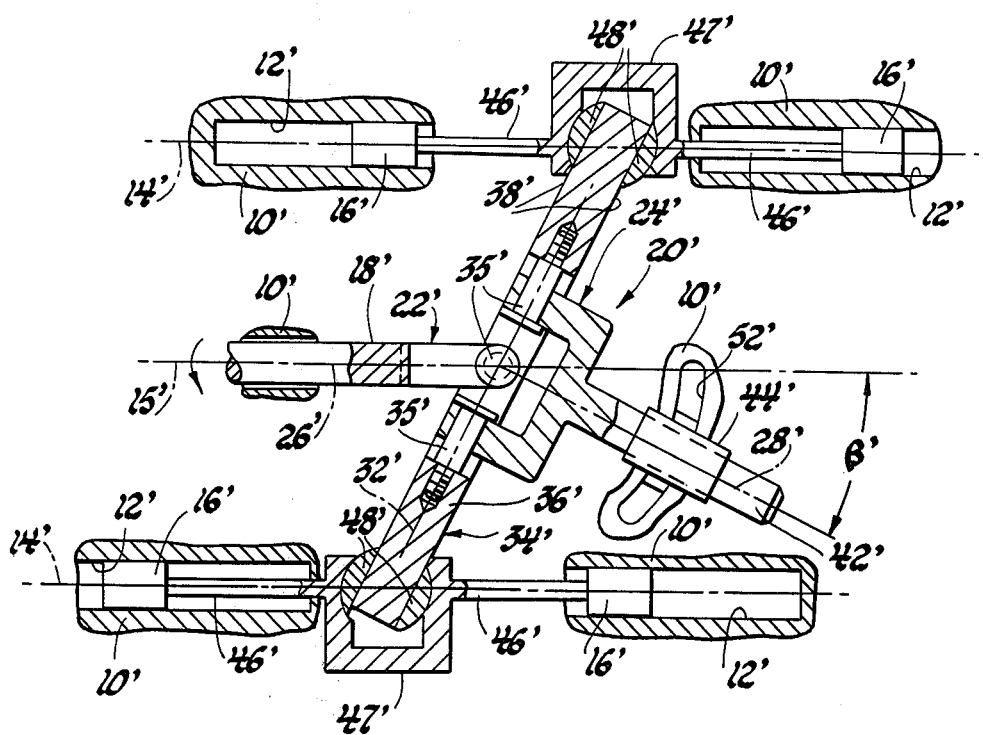
FIG. 3 is a schematic view of an axial-piston machine with a stationary cylinder block and double-acting pistons and having incorporated therein another embodiment of the swash plate drive mechanism according to the present invention.

Referring to FIGS. 1 and 2, there is shown an axial-piston machine having a stationary cylinder block 10 with a plurality of cylinders 12 whose respective centerlines 14 are arranged parallel to and radially and angularly spaced about a centerline 15. Single-acting pistons 16 are mounted for reciprocation in the cylinders and it will be understood that the axial-piston machine may, for example, be a compressor or engine. In either event, drive is to be provided between the pistons 16 and an axially restrained shaft 18 which is rotatably mounted in the cylinder block 10 with the shaft 18 and connected yoke 22 being referred to as the input or driver where the machine operates as a compressor and being referred to as the output or driven member where the machine operates as an engine. Moreover, the shaft 18 need not be parallel to the cylinders 12 and may be at some angle $\phi$ relative thereto as described in more detail later.

A swash plate drive mechanism according to the present invention generally designated as 20 is incorporated as the drive between the pistons 16 and shaft 18 and effects double-frequency drive therebetween, i.e. two reciprocations of the pistons 16 for each revolution of the shaft 18. The swash plate drive mechanism utilizes a Hooke-type universal joint arrangement wherein there is provided a pair of yokes 22 and 24 each with a longitudinal axis 26 and 28 and a cross-axis 30 and 32, respectively. The yokes 22 and 24 are pivotally interconnected like in a Hooke-type universal joint by a swash plate 34 and pivot pins 35 which together form the floating or cross-link of the universal joint. The swash plate 34 comprises a cylindrical disk 36 having radially extending parallel sides 38 and a hollow center 39 in which the respective arms 40 and 41 of the yokes 22 and 24 are received from opposite sides thereof. The disk 36 is connected to the yoke arms 40 and 41 for pivotal movement about the yokes' cross-axes 30 and 32 by the pivot pins 35 which may be provided by shoulder bolts as shown that are threaded to the interior of the disk and suitably journalled in the ends of the yoke arms.

The swash plate drive mechanism 20 is incorporated in the axial-piston machine by fixing the yoke 22 to the shaft 18 while the other yoke 24 is fixed to a shaft 42 to serve as reaction in the drive mechanism, the shaft 42 for this purpose being rotatably supported in a bearing 44 that is either fixed in the cylinder block 10 or is movable as shown to provide variable stroke (displacement) as will be described in more detail later. Drive between the disk 36 and each of the pistons 16 is provided by a connecting rod 46 which is fixed at one end to its respective piston and is provided at its opposite end with a yoke 47 which straddles the outer periphery of the disk. Each of the connecting rod yokes 47 retains a pair of shoes 48 which on one side are flat and slidably engage the opposite sides of the disk and on their opposite side are provided with a spherical surface received in a correspondingly shaped socket in the facing inner side of the rod yoke.

The direction of motion of the pistons 16 relative to the longitudinal axis 26 of the yoke 22 has been found to be arbitrary to a considerable extent. The motion of the swash plate 34 imparts a motion to each piston which is very nearly harmonic with the phase difference between the motions of any two pistons almost exactly equal to the angular difference in their circumferential positions about the cylinder block centerline 15. In the case in which angle $\phi = (\frac{1}{2})\beta$, where $\beta$ is the angle between this axis and the longitudinal axis 28 of the other yoke 24, the deck height is the same for each piston. The drive can therefore be used with an arbitrary number of axially disposed pistons and functions in this respect like a normal swash plate. However, the frequency of the piston motion is twice that of the input or output by the construction of the swash plate 34 as an articulated Hooke-type universal joint cross-link in contrast to conventional non-articulated swash plate drive mechanisms in which these frequencies are equal because of the normal swash plate affixation with the input or output. Having this in mind it will thus be seen that with the articulated swash plate drive mechanism 20 and for a given radial offset between the driving or driven axis 26 and the cylinder centerlines 14, the sliding velocity between the connecting rods 46 and the disk 36 is one-half that of a conventional swash plate drive of equal capacity and thus a substantial advantage thereover.

For example, in the case of a compressor where the shaft 18 and connected yoke 22 is then the driver or input and if the speed of same and that of a conventional non-articulated swash plate drive were equal, the drives would generate the same power when the amplitudes of the piston displacements of this new drive which operates at twice the frequency of the conventional drive are only one-half those of the conventional drive. Under these circumstances, the swash plate mechanism of the present invention could, therefore, be made more compact. Moreover, the articulated swash plate drive mechanism 20 of the present invention does not require a 90° angle between the cross-axes 30, 32 of its yokes as it has been discovered that any angle between approximately $(1.5)\beta$ and 90° is feasible with the smaller angles providing a larger stroke for a given size swash plate while introducing an axial offset between the height of the deck 49 of each cylinder. On the other hand, for a constant deck height as shown in FIG. 1, it is necessary that the angle between the yoke cross-axes be a right angle and that the direction of piston motion be perpendicular to the bisecting plane between the longitudinal axes 26, 28 of the yokes. Furthermore, it will be seen that piston stroke is directly proportional to the radial offset between the input or output swash plate yoke axis 26 and the cylinder centerlines 14, very nearly to the sine of one-half the angle $\beta$ between the swash plate yoke longitudinal axes 26, 28 and very nearly inversely proportional to the sine of the angle between the swash plate yoke cross-axes 30, 32. The stroke is also very nearly inversely proportional to the transmission angle of the swash plate joint linkage. Also, it will be appreciated that no power is transmitted by the yoke 24 and connected shaft 42 which would normally serve as the output in a universal joint since this shaft is now a reaction member in the articulated swash plate drive mechanism of the present invention.

The swash plate drive mechanism of the present invention can also be used in axial compressors or engines to provide either fixed or variable stroke (displacement). For example, operation as a variable-stroke device while controlling compression ratio or clearance volume can be achieved in several ways. In the FIGS. 1-2 axial-piston machine, this is accomplished by changing the angle $\phi$ between the input (output) yoke longitudinal axis 26 and the other yoke's longitudinal axis 28, maintaining the angle $\phi=(\frac{1}{2})\beta$ between the directions of piston motion and the input (output) yoke longitudinal axis 26 and varying the relative axial position of the cylinder block 10 and the input (output) yoke 22. One possible arrangement for thus effecting stroke change is shown in FIGS. 1 and 2 wherein the bearing 44 for the shaft 42 is fixed to a slider 50 that is guided in a non-circular curved track or slot 52 in the cylinder block 10. The track 52 extends parallel to the plane of the longitudinal axis 28 and the axis of shaft 18 and is provided with a varying radius to provide a 2:1 angular connection between yoke 24 and the cylinder block 10 such that there is maintained the angle $\phi=(\frac{1}{2})\beta$ in the plane of the longitudinal axis 28 and the axis of the shaft 18 between the directions of piston motion and the axis 26 of the input (output).

Another arrangement of an axial-piston machine incorporating the swash plate drive mechanism of the present invention is shown in FIG. 3 wherein the machine has double-acting pistons operating parallel to the input or output. In this machine arrangement, wherein parts similar to those shown in FIGS. 1 and 2 are identified by the same numbers only primed, the pistons 16' are arranged in a double-acting manner and operate in aligned cylinders 12' on opposite sides of the swash plate mechanism 20', there being provided two sets of double-acting pistons with the cylinder centerlines 14' located in the same plane that contains the longitudinal axes 26' and 28' of the respective yokes 22' and 24'. The longitudinal axis 26' of the input (output) yoke 22' connected to shaft 18' is now parallel to the cylinder and piston centerlines 15' and as a result, the stroke control slot 52' can then be made circular with its center at the intersection of the yoke cross-axes 30' and 32' rather than having axial adjustment as explained in the FIGS. 1-2 embodiment. Otherwise the swash plate drive mechanism 20' is like that disclosed in the FIGS. 1 and 2 arrangement and operates to provide double frequency drive with either a fixed or variable stroke.

And it will be understood by those skilled in the art that the above described embodiments are intended to be illustrative of the invention which may be modified within the scope of the appended claims.

The embodiments of the invention in which an exclusive property or privilege is claimed are defined as follows:

1. A swash plate drive mechanism comprising a pair of rotary shafts with intersecting axes, and an articulated swash plate connected as a floating link between said shafts for pivotal movement about crossed-axes such that said shafts are caused to rotate conjointly while said articulated swash plate is caused to oscillate twice each revolution of said shafts to hereby effect double-frequency swash plate drive motion.

2. A swash plate drive mechanism for an axial piston machine of the type having a swash plate that is slidably drivingly connected with a piston that is reciprocable in a cylinder block characterized in that the swash plate drive mechanism comprises a pair of rotary shafts with intersecting axes, and the swash plate is connected as a floating link between said shafts for pivotal movement about crossed-axes such that said shafts are caused to rotate conjointly while the swash plate is caused to oscillate twice each revolution of said shafts to thereby effect double-frequency drive motion between the piston and said shafts.

3. A swash plate drive mechanism for an axial piston machine of the type having a swash plate that is slidably drivingly connected with a piston that is reciprocable in a stationary cylinder block characterized in that the swash plate drive mechanism comprises a pair of rotary shafts with intersecting axes, means for supporting said shafts for rotation about their respective axis in a predetermined fixed angular relationship, and the swash plate being connected as a floating link between said shafts for pivotal movement about crossed-axes such that said shafts are caused to rotate conjointly while the swash plate is caused to oscillate and reciprocate the piston twice for each revolution of said shafts.

4. A swash plate drive mechanism for an axial piston machine of the type having a swash plate that is slidably drivingly connected with a piston that is reciprocable in a stationary cylinder block characterized in that the swash plate drive mechanism comprises a pair of rotary shafts with intersecting axes, means for supporting said shafts for rotation about their respective axis and permitting change in the angle between the axes of said shafts, and the swash plate being connected as a floating link between said shafts for pivotal movement about crossed-axes while said shafts are connected to rotate conjointly whereby the swash plate is caused to oscillate and reciprocate the piston twice for each revolution of said shafts, and whereby the piston stroke varies with the angle between the axes of said shafts with the piston stroke reaching zero on alignment of the shaft axes.

* * * * *

UNITED STATES PATENT AND TRADEMARK OFFICE
CERTIFICATE OF CORRECTION

PATENT NO. : 4,418,586

DATED : December 6, 1983

INVENTOR(S) : E. Roland Maki et al

It is certified that error appears in the above-identified patent and that said Letters Patent is hereby corrected as shown below:

Column 4, line 42, claim 1, "hereby" should read -- thereby --.

Signed and Sealed this

Fifth Day of June 1984

[SEAL]

Attest:

GERALD J. MOSSINGHOFF

Attesting Officer

Commissioner of Patents and Trademarks